United States Patent
Yang et al.

(10) Patent No.: US 12,472,215 B2
(45) Date of Patent: Nov. 18, 2025

(54) LACTOBACILLUS HELVETICUS STRAIN AND COMPOSITION CONTAINING SAME FOR PREVENTION OR TREATMENT OF INFLAMMATORY DISEASES

(71) Applicants: GI BIOME, Seongnam-si (KR); MEDIOGEN CO., LTD., Jecheon-si (KR)

(72) Inventors: Bo Gie Yang, Seoul (KR); Myung Ho Jang, Seoul (KR); Chang Ho Kang, Chungju-si (KR); Nam Soo Paek, Seoul (KR)

(73) Assignees: GI BIOME, Seongnam-si (KR); MEDIOGEN CO., LTD., Jecheon-si (KR)

( * ) Notice: Subject to any disclaimer, the term of this patent is extended or adjusted under 35 U.S.C. 154(b) by 432 days.

(21) Appl. No.: 17/904,939

(22) PCT Filed: Feb. 25, 2021

(86) PCT No.: PCT/KR2021/002389
§ 371 (c)(1),
(2) Date: Aug. 24, 2022

(87) PCT Pub. No.: WO2021/172900
PCT Pub. Date: Sep. 2, 2021

(65) Prior Publication Data
US 2023/0158087 A1  May 25, 2023

(30) Foreign Application Priority Data
Feb. 26, 2020 (KR) .......... 10-2020-0023297

(51) Int. Cl.
*A61K 35/747* (2015.01)
*A23L 33/135* (2016.01)
(Continued)

(52) U.S. Cl.
CPC .......... *A61K 35/747* (2013.01); *A23L 33/135* (2016.08); *A61P 1/00* (2018.01); *C12N 1/20* (2013.01); *C12R 2001/225* (2021.05)

(58) Field of Classification Search
CPC ....... A61K 35/747; A23L 33/135; A61P 1/00; C12N 1/20; C12R 2001/225
See application file for complete search history.

(56) References Cited

U.S. PATENT DOCUMENTS

2004/0071680 A1   4/2004   Song et al.
2011/0081320 A1   4/2011   Westall et al.
(Continued)

FOREIGN PATENT DOCUMENTS

| CN | 108085285 A | 5/2018 |
| CN | 110218681 A | 9/2019 |

(Continued)

OTHER PUBLICATIONS

International Search Report, mailed Jul. 1, 2022, for International Patent Application No. PCT/KR2022/003890, with English translation. (5 pages).

(Continued)

*Primary Examiner* — Louise W Humphrey
*Assistant Examiner* — Rachel Emily Martin
(74) *Attorney, Agent, or Firm* — Seed IP Law Group LLP

(57) ABSTRACT

Provided are a *Lactobacillus helveticus* strain and a composition for preventing or treating inflammatory disease containing the same. The *Lactobacillus helveticus* strain (Accession No. KCTC 14110BP) according to the present invention alleviates symptoms of inflammatory bowel disease, such as weight loss and bowel length reduction, and it does not have side effects that have been seen with existing drug treatment. Therefore, the *Lactobacillus helveticus* strain can be effectively used for the treatment and preven- (Continued)

tion of inflammatory disease, particularly inflammatory bowel disease.

9 Claims, 10 Drawing Sheets

(51) Int. Cl.
    *A61P 1/00*           (2006.01)
    *C12N 1/20*         (2006.01)
    *C12R 1/225*       (2006.01)

(56) References Cited

U.S. PATENT DOCUMENTS

| | | |
|---|---|---|
| 2015/0343003 A1 | 12/2015 | Kullisaar et al. |
| 2020/0069748 A1 | 3/2020 | Paek et al. |
| 2021/0115392 A1 | 4/2021 | Park |

FOREIGN PATENT DOCUMENTS

| | | | |
|---|---|---|---|
| CN | 111793577 | A | 10/2020 |
| JP | 2004-250338 | A | 9/2004 |
| JP | 2011121923 | A | 6/2011 |
| KR | 1020020072913 | A | 9/2002 |
| KR | 20050010451 | A | 1/2005 |
| KR | 100996577 | B1 | 11/2010 |
| KR | 20120067683 | A | 6/2012 |
| KR | 20130045511 | A | 5/2013 |
| KR | 20130046896 | A | 5/2013 |
| KR | 101287120 | B1 | 7/2013 |
| KR | 101394348 | B1 | 5/2014 |
| KR | 101494279 | B1 | 4/2015 |
| KR | 1020150068061 | A | 6/2015 |
| KR | 20160098149 | A | 8/2016 |
| KR | 20180011490 | A | 2/2018 |
| KR | 101981333 | B1 | 5/2019 |
| KR | 20190051771 | A | 5/2019 |
| KR | 20190051772 | A | 5/2019 |
| KR | 101985792 | B1 | 6/2019 |
| KR | 102021883 | B1 | 9/2019 |
| KR | 10-2038695 | B1 | 10/2019 |
| KR | 102028744 | B1 | 10/2019 |
| WO | 2011052996 | A2 | 5/2011 |
| WO | 2012074351 | A1 | 6/2012 |
| WO | 2019190146 | A2 | 10/2019 |

OTHER PUBLICATIONS

Lee et al., "*Lactobacillus plantarum* Strain Ln4 Attenuates Diet-Induced Obesity, Insulin Resistance, and Changes in Hepatic mRNA Levels Associated with Glucose and Lipid Metabolism," *Nutrients* 10(643), May 19, 2018. (15 pages).

Balakumar et al., "Improvement in glucose tolerance and insulin sensitivity by probiotic strains of Indian gut origin in high-fat diet-fed C57BL/6J mice," *European Journal of Nutrition* 57:279-295, 2016.

International Search Report, mailed Apr. 26, 2021, for International Patent Application No. PCT/KR2020/019344. (8 pages).

International Search Report, mailed Apr. 27, 2021, for International Patent Application No. PCT/KR2020/019346. (8 pages).

International Search Report, mailed Apr. 27, 2021, for International Patent Application No. PCT/KR2020/019347. (7 pages).

Tomaro-Duchesneau et al., "Effect of orally administered *L. fermentum* NCIMB 5221 on markers of metabolic syndrome: an in vivo analysis using ZDF rats," *Appl Microbial Biotechnol* 98:115-126, 2014.

Ahn et al., "Effect of dietary probiotics on colon length in an inflammatory bowel disease- induced murine model: A meta-analysis," *Journal of Dairy Science* 103(2):1807-1819, 2020 [Published Online Nov. 2019] (13 pages).

Extended European Search Report, mailed Jul. 18, 2023, for European Patent Application No. 21761000.5. (11 pages).

Kawano et al., "*Lactobacillus helveticus* SBT2171 Induces A20 Expression via Toll-Like Receptor 2 Signaling and Inhibits the Lipopolysaccharide-Induced Activation of Nuclear Factor-kappa B and Mitogen-Activated Protein Kinases in Peritoneal Macrophages," *Frontiers in Immunology* 10:845, Apr. 2019. (13 pages).

Rong et al., "Oral Intake of Lactobacillus helveticus NS8 Alleviates Ovalbumin-Induced Atopic Dermatitis in SKH-1 Hairless Mice," *Indian Journal of Microbiology* 58(3):312-318, 2018 [Published Online Apr. 2018] (7 pages).

Taverniti et al., "Health-Promoting Properties of *Lactobacillus helveticus*," *Frontiers in Microbiology* 3:392, Nov. 2012. (13 pages).

International Search Report, mailed Jun. 14, 2021, for International Patent Application No. PCT/KR2021/002389, 4 pages.

Kang et al., "Antibacterial Activity and Probiotic Properties of Lactic Acid Bacteria Isolated from Traditional Fermented Foods," *Korean Society for Biotechnology and Bioengineering Journal* 32(3):199-205, 2017 (with English Abstract).

Kim et al., "*Lactobacillus helveticus* suppresses experimental rheumatoid arthritis by reducing inflammatory T cell responses," *Journal of Functional Foods* 13:350-362, 2015.

Rong et al., "Probiotic and anti-inflammatory attributes of an isolate *Lactobacillus helveticus* NS8 from Mongolian fermented koumiss," *BMC Microbiology* 15:196, 2015. (11 pages).

Bhathena et al., "Effect of Orally Administered Microencapsulated FA-Producing L. fermentum on Markers of Metabolic Syndrome: An In Vivo Analysis," Journal of Diabetes & Metabolism S2:009, May 25, 2012. (10 pages).

Yadav et al., "Consumption of Probiotic Lactobacillus fermentum MTCC: 5898-Fermented Milk Attenuates Dyslipidemia, Oxidative Stress, and Inflammation in Male Rats Fed on Cholesterol-Enriched Diet," Probiotics and Antimicrobial Proteins 11:509-518, 2019 [Published online May 13, 2018]. (10 pages).

U.S. Appl. No. 17/758,210, filed Jun. 29, 2022.
U.S. Appl. No. 17/758,212, filed Jun. 29, 2022.
U.S. Appl. No. 17/758,216, filed Jun. 29, 2022.
2023/0012950, Jan. 19, 2023.
2023/0038910, Feb. 9, 2023.
2023/0111353, Apr. 13, 2023.
2023/0158087, May 25, 2023.
2024/0293484, Sep. 5, 2024.

[FIG. 1]
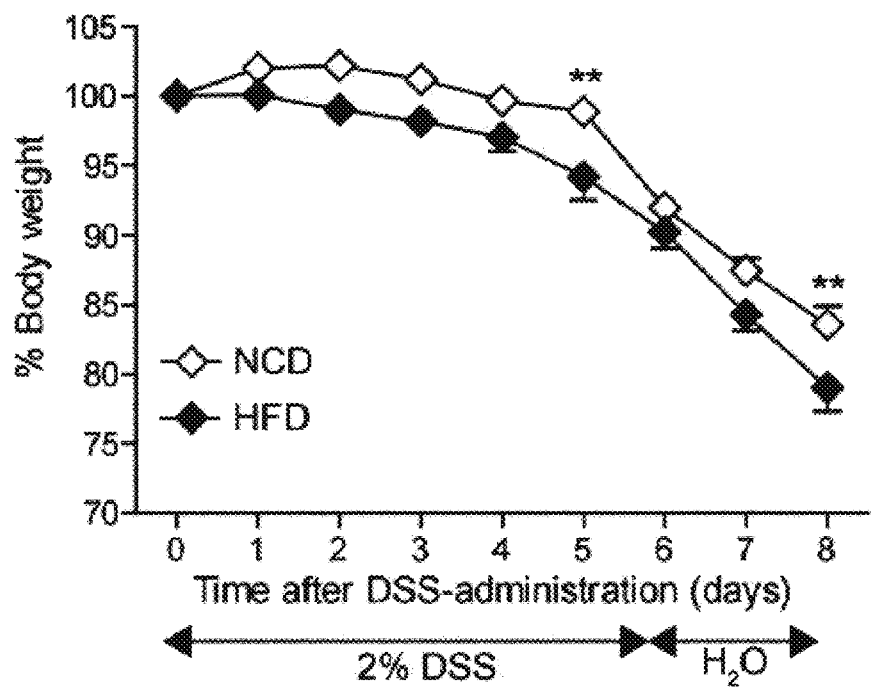
[FIG. 2a]
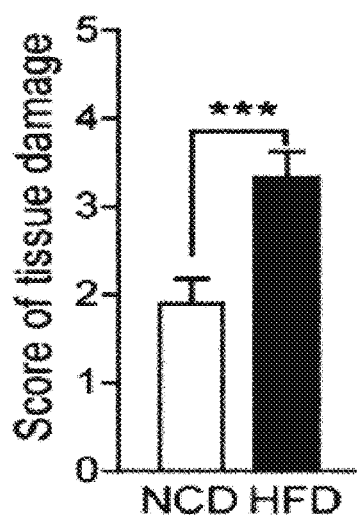

【FIG. 2b】
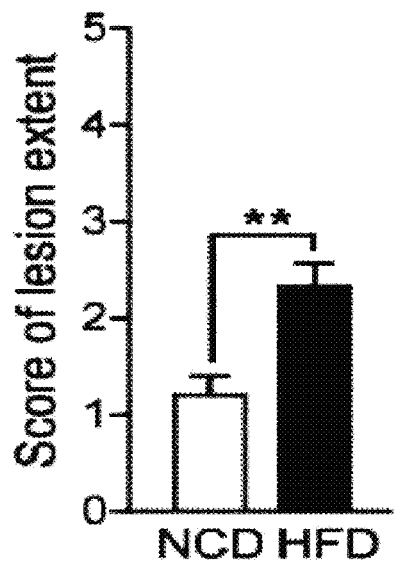
【FIG. 3】
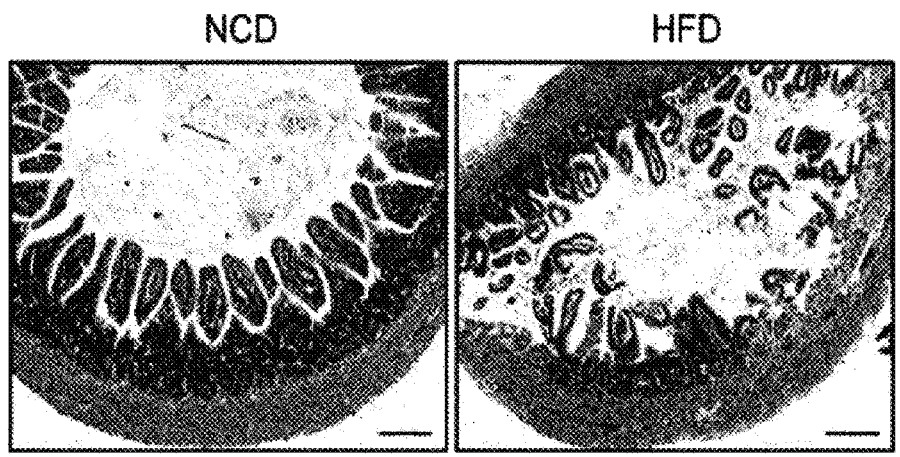

[FIG. 4]
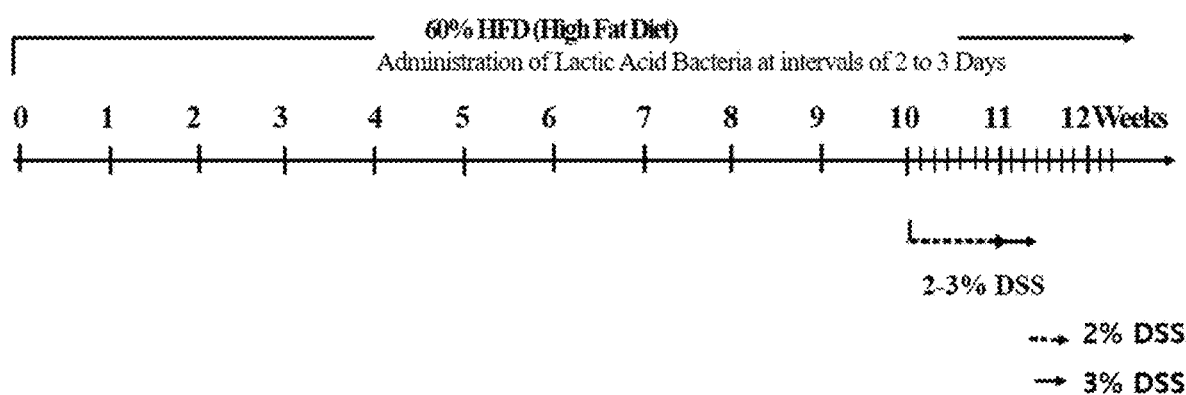

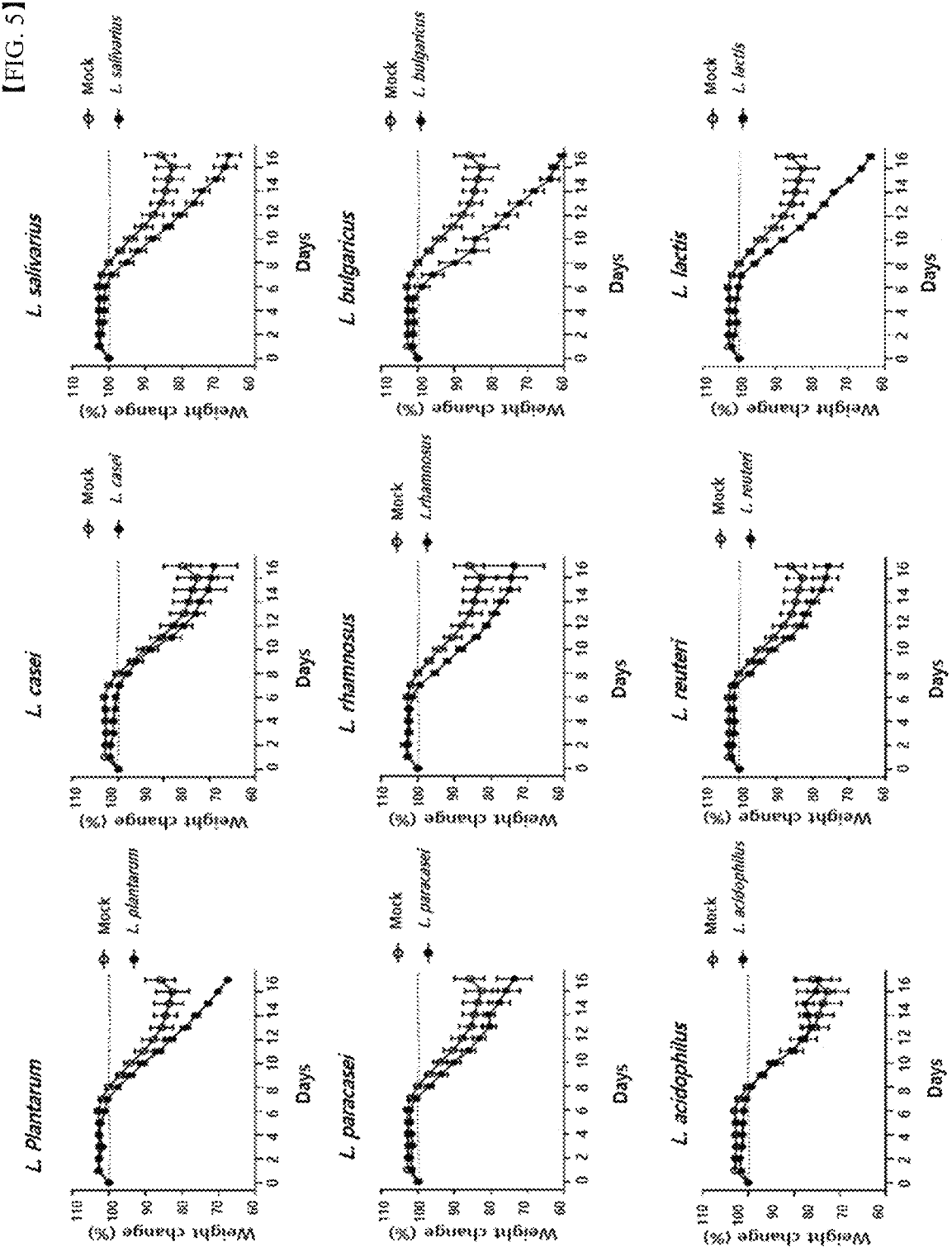
[FIG. 5]

[FIG. 6]
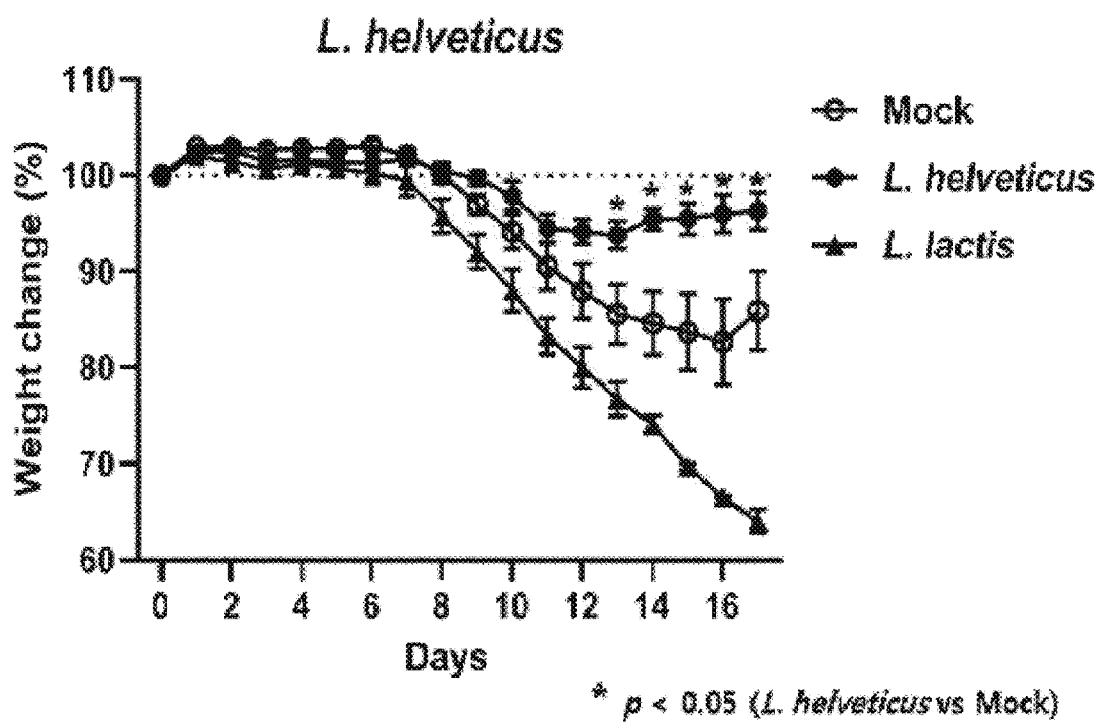

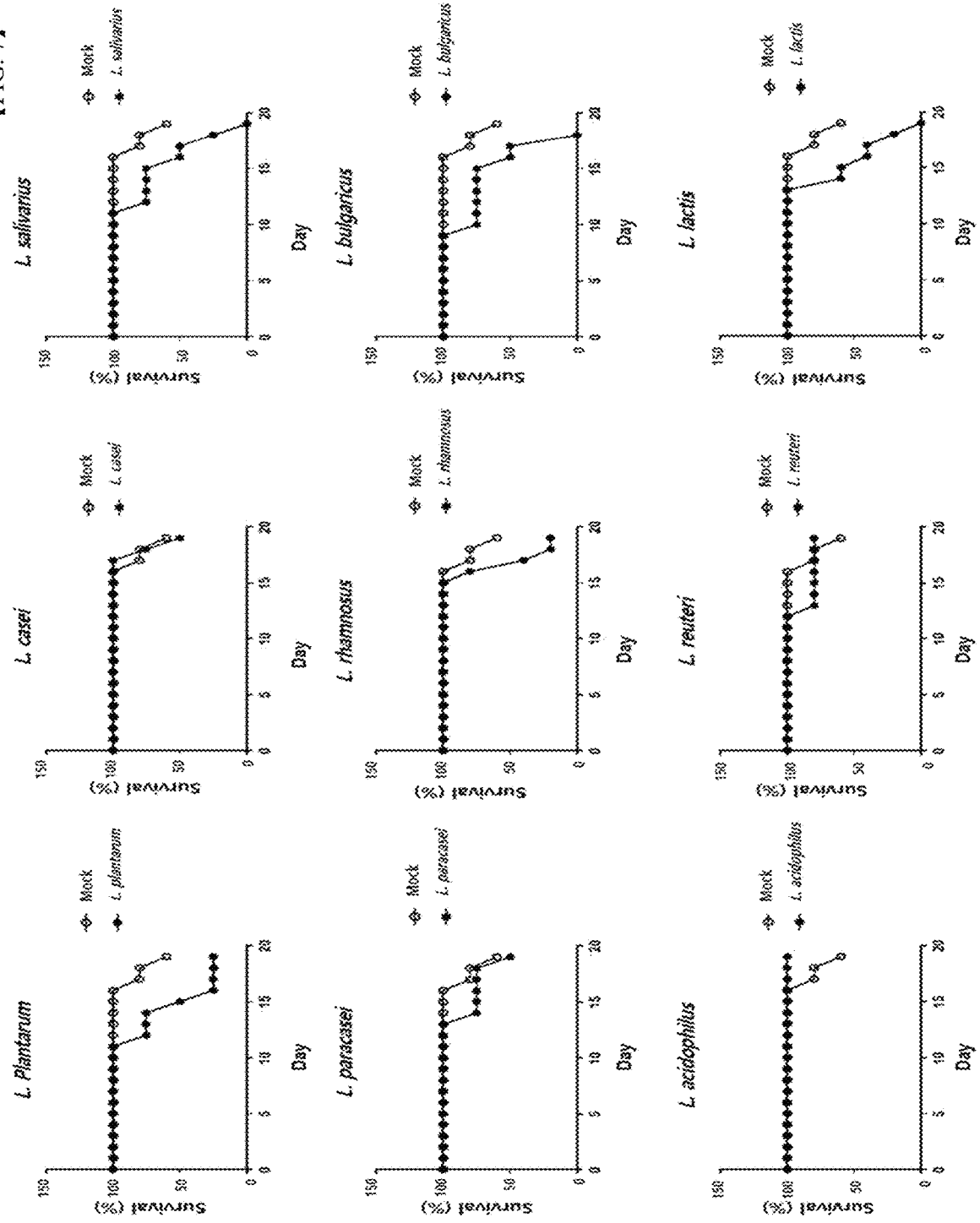
[FIG. 7]

[FIG. 8]
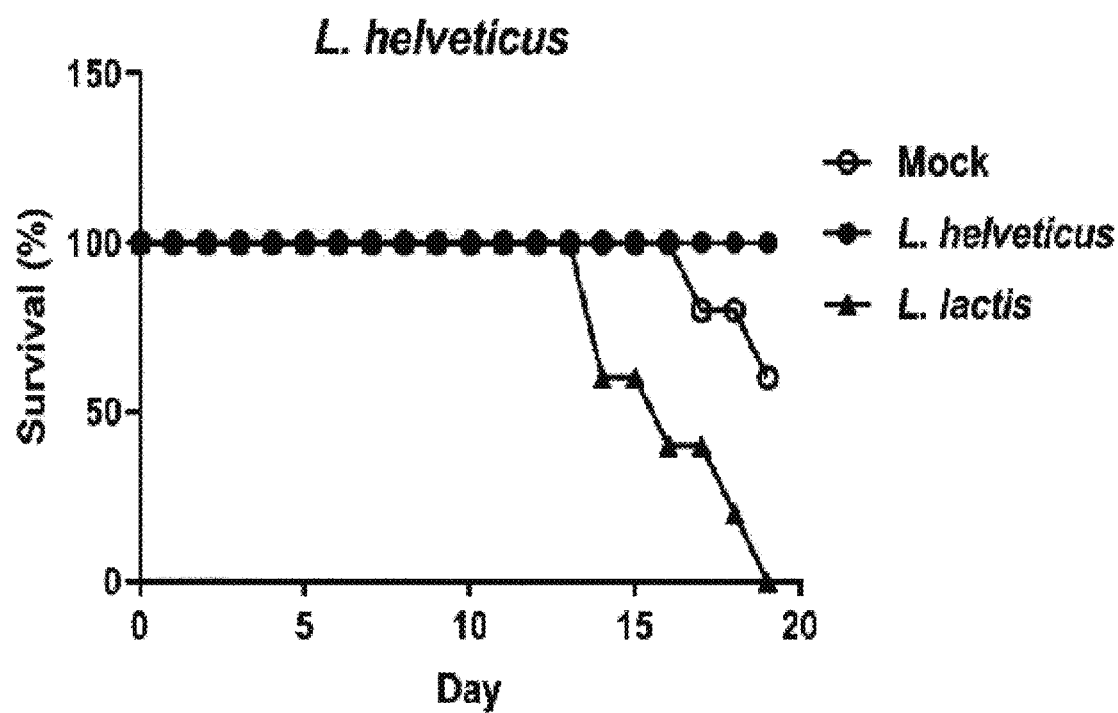

[FIG. 9]
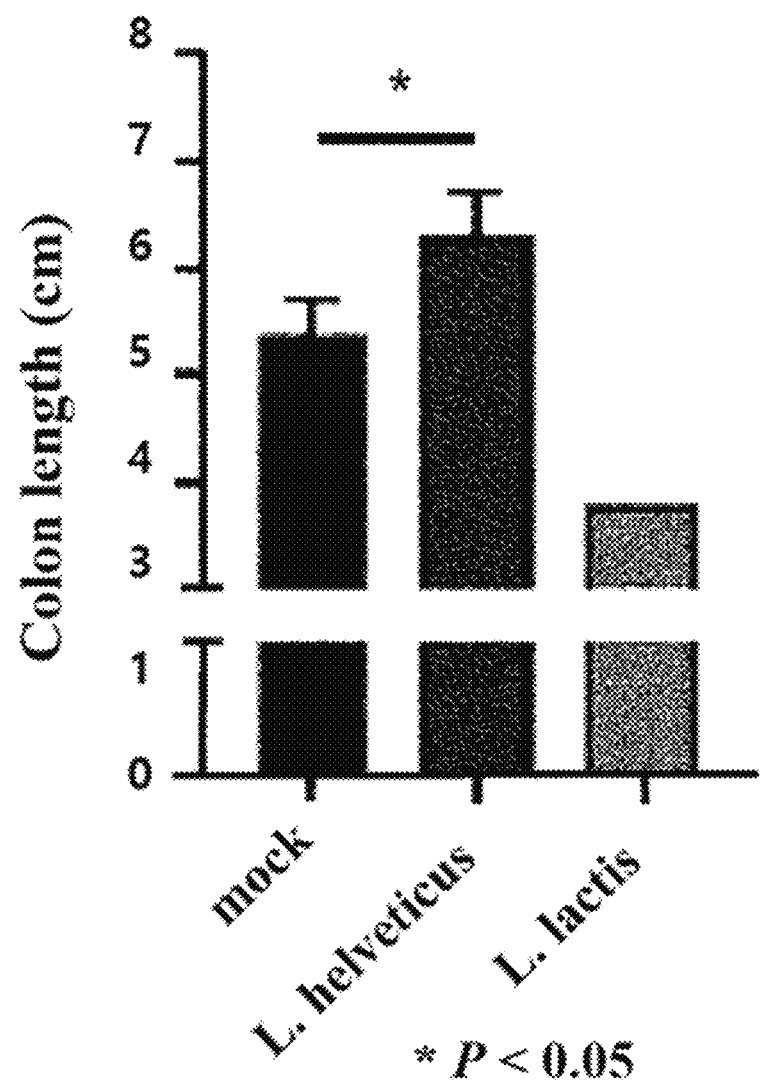

[FIG. 10]
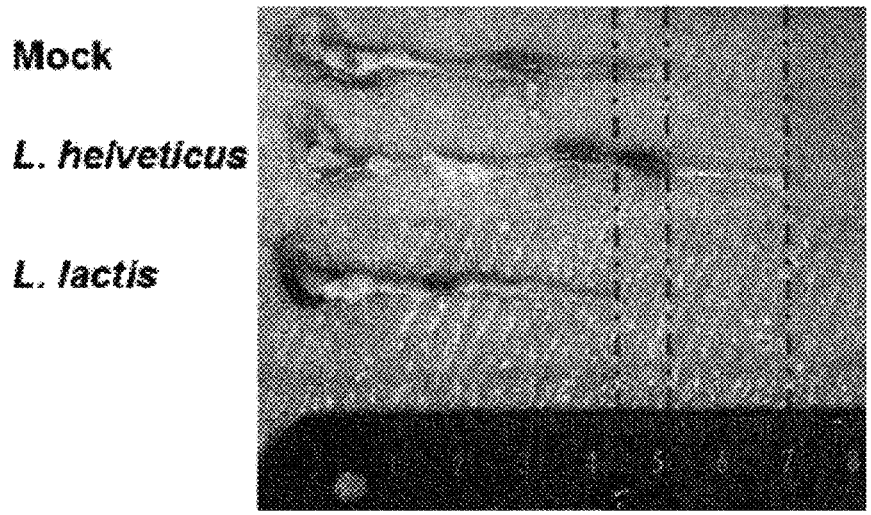

[FIG. 11]
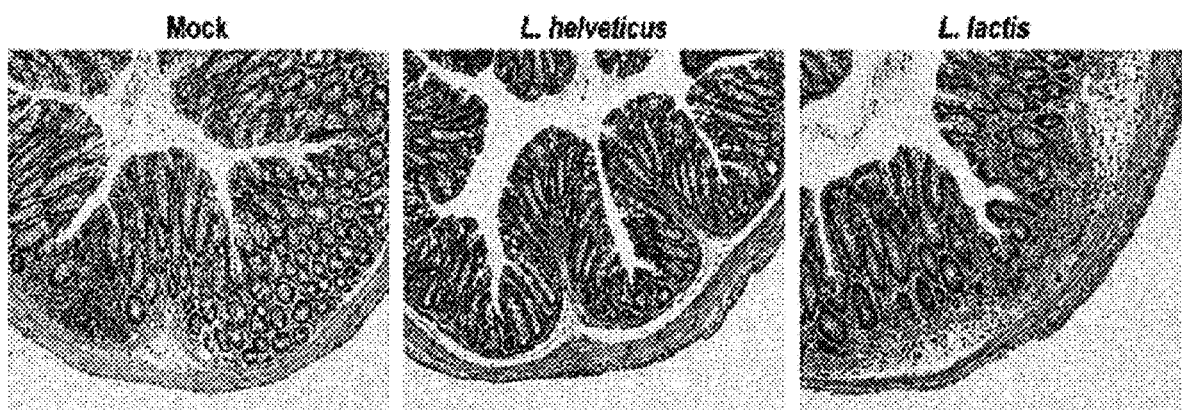

LACTOBACILLUS HELVETICUS STRAIN AND COMPOSITION CONTAINING SAME FOR PREVENTION OR TREATMENT OF INFLAMMATORY DISEASES

TECHNICAL FIELD

The present disclosure relates to a *Lactobacillus helveticus* strain and a composition for preventing or treating inflammatory disease containing the same.

BACKGROUND ART

The incidence of inflammatory bowel disease is rapidly increasing due to westernized dietary habits. Inflammatory bowel disease is a disease in which abnormal chronic inflammation in the intestine repeats alleviation and recurrence. Inflammatory bowel disease includes Crohn's disease (CD), ulcerative colitis (UC), intestinal Bechet's disease, etc. The exact pathogenesis of inflammatory bowel disease has not yet been identified, and genetic and immunological abnormalities and environmental factors (e.g., stress, drugs, etc.) are known to be involved.

Although sulfasalazine has been used as a treatment for inflammatory bowel disease, it has side effects such as nausea, vomiting, anorexia, headache, anemia, etc. Therefore, there is a continued demand for research and development of a safe therapeutic agent for inflammatory bowel disease without side effects.

Meanwhile, in recent years, probiotics for preventing or treating inflammatory bowel disease using fungi (e.g., lactic acid bacteria), which have been considered as safe microorganisms, are being actively studied. With respect to the lactic acid bacteria associated with the preventative and therapeutic effects of inflammatory bowel disease, it has been reported that *Lactobacillus casei* inhibits the expression of IL-12 or TNF-α, which are inflammatory cytokines (Matsumoto, S., et al. *Clin Exp Immunol.* 2005, 140, 417-426). In addition, it has been reported that IRT5, a probiotic mixture containing 5 strains (*Bifidobacterium bifidum, L. casei, L. acidophilus, L. reuteri*, and *Streptococcus thermophilus*), effectively inhibits inflammation in models of atopic dermatitis and inflammatory bowel disease (Kang and *Im, J Nutr Sci Vitaminol.*, 61, 2015, S103-S105). However, the effect has not yet reached the level of commercial success.

Therefore, there is a need for continued research on novel strains that are effective against inflammatory bowel disease.

DETAILED DESCRIPTION OF THE INVENTION

Technical Problem

Under the circumstances, the present inventors have made efforts to develop a novel strain with an excellent effect for inflammatory bowel disease. As a result, they have discovered that a *Lactobacillus helveticus* strain (Accession No. KCTC 14110BP) exhibits an excellent therapeutic effect on inflammatory bowel disease, thereby completing the present disclosure.

Solution to Problem

To achieve the above, in accordance with an exemplary embodiment, the present disclosure provides a *Lactobacillus helveticus* strain (Accession No. KCTC 14110BP).

In accordance with another exemplary embodiment, the present disclosure provides a pharmaceutical composition for preventing or treating inflammatory disease containing a *Lactobacillus helveticus* strain (Accession No. KCTC 14110BP) or a culture thereof as an active ingredient.

In accordance with still another exemplary embodiment, the present disclosure provides a food composition for preventing or inhibiting inflammatory disease containing a *Lactobacillus helveticus* strain (Accession No. KCTC 14110BP) or a culture thereof.

In accordance with still another exemplary embodiment, the present disclosure provides a feed composition for preventing or inhibiting inflammatory disease containing a *Lactobacillus helveticus* strain (Accession No. KCTC 14110BP) or a culture thereof.

In accordance with still another exemplary embodiment, the present disclosure provides a method for preventing or treating inflammatory disease, which includes administering a *Lactobacillus helveticus* strain (Accession No. KCTC 14110BP) or a culture thereof to a subject.

Effect of the Invention

The *Lactobacillus helveticus* strain (Accession No. KCTC 14110BP) according to the present invention alleviates symptoms such as weight loss and bowel length reduction in inflammatory bowel disease, and it does not have side effects that have been seen with existing drug treatment. Therefore, the *Lactobacillus helveticus* strain can be effectively used for the treatment of inflammatory disease, particularly inflammatory bowel disease.

BRIEF DESCRIPTION OF DRAWINGS

Exemplary embodiments can be understood in more detail from the following description taken in conjunction with the accompanying drawings, in which:

FIG. 1 is a graph showing the comparison results of changes in body weight between an inflammatory bowel disease-induced mouse fed with a high fat diet (HFD) and an inflammatory bowel disease-induced mouse fed with a general diet (NCD) (**$p<0.01$, NCD vs. HFD);

FIG. 2 is a histogram showing the scored results of extent of tissue damage (FIG. 2a) and extent of lesion (FIG. 2b) of an inflammatory bowel disease-induced mouse fed with a high fat diet (HFD) and an inflammatory bowel disease-induced mouse fed with a general diet (NCD) ($p<0.01$; *$p<0.001$, NCD vs. HFD);

FIG. 3 shows images of stained intestinal tissue of an inflammatory bowel disease-induced mouse fed with a high fat diet (HFD) and an inflammatory bowel disease-induced mouse fed with a general diet (NCD);

FIG. 4 is a drawing showing an experiment schedule for screening strains having a therapeutic effect on inflammatory bowel disease in accordance with an exemplary embodiment according to the present invention;

FIGS. 5 and 6 are graphs showing the changes in the amount of body weight of each inflammatory bowel disease-induced mouse, which was fed with a high fat diet, after oral administration of 10 strains of lactic acid bacteria (*$p<0.05$, *L. helveticus* vs. Mock);

FIGS. 7 and 8 are graphs showing the survival rate for 20 days of each inflammatory bowel disease-induced mouse, which was fed with a high fat diet, after oral administration of 10 strains of lactic acid bacteria;

FIG. 9 is a histogram showing the colon length of each inflammatory bowel disease-induced mouse, which was fed with a high fat diet, after oral administration of a *L. helveticus* MG585 strain or a *L. lactis* strain (*p<0.05, *L. helveticus* vs. Mock);

FIG. 10 is an image showing the colon length of each inflammatory bowel disease-induced mouse, which was fed with a high fat diet, after oral administration of a *L. helveticus* MG585 strain or a *L. lactis* strain; and FIG. 11 shows images of the stained intestinal tissue of each inflammatory bowel disease-induced mouse, which was fed with a high fat diet, after oral administration of a *L. helveticus* MG585 strain or a *L. lactis* strain.

BEST MODE FOR CARRYING OUT THE INVENTION

Hereinafter, specific embodiments will be described in detail.

An aspect according to the present invention provides a *Lactobacillus helveticus* strain (Accession No. KCTC 14110BP).

The *Lactobacillus* is an aerobic or facultative anaerobic, gram-positive microorganism of the genus *Bacillus*, which is widely distributed in nature. Microorganisms belonging to the genus *Lactobacillus* include *Lactobacillus helveticus*, *Lactobacillus* Sakei, etc. The present inventors screened a novel strain of *Lactobacillus helveticus* having an excellent therapeutic effect on inflammatory diseases, especially on inflammatory bowel disease, and named it "*Lactobacillus helveticus* MG585." The strain was deposited for an international patent at the Korean Collection for Type Cultures (KCTC) of Korea Research Institute of Bioscience and Biotechnology (KRIBB) under the Accession No. KCTC 14110BP on Jan. 14, 2020. In addition, the strain belongs to a probiotic strain, is harmless to the human body, and can be used without side effects.

As used herein, the term "*Lactobacillus helveticus* MG585" may also be described as a *L. helveticus* MG585 or *Lactobacillus helveticus* strain (Accession No. KCTC 14110BP).

Another aspect of the present invention provides a pharmaceutical composition for preventing or treating inflammatory disease including, as an active ingredient, a *Lactobacillus helveticus* strain (Accession No. KCTC 14110BP) or a culture thereof.

The *Lactobacillus helveticus* strain (Accession No. KCTC 14110BP) is the same as described above. At this time, the strain may be alive or dead, and alive strain is preferred.

The culture of the strain may or may not contain the strain, and it is preferred to contain the strain. In addition, the culture of the strain may be in the form of a lysate.

The composition includes, as an active ingredient, a *Lactobacillus helveticus* strain (Accession No. KCTC 14110BP) or a culture thereof in a therapeutically effective amount or at a nutritionally effective concentration based on the total weight of the composition, and preferably, at a content of $10^8$ CFU/g to $10^{12}$ CFU/g, or a culture having an equivalent number of the alive strain. In general, for an adult patient, $1\times10^6$ CFU/g or more of the alive strain, preferably $1\times10^8$ CFU/g to $1\times10^{12}$ CFU/g of the alive strain may be administered once or divided in several times.

In accordance with an exemplary embodiment according to the present invention, the *Lactobacillus helveticus* strain (Accession No. KCTC 14110BP) may be one which has a therapeutic effect on inflammatory bowel disease. Specifically, in an exemplary embodiment according to the present invention, when an inflammatory bowel disease-induced mouse was orally administered with the *Lactobacillus helveticus* strain (Accession No. KCTC 14110BP), the mouse showed an increase of the body weight. In contrast, when each mouse was orally administered with 9 different strains of lactic acid bacteria, these mice showed a decrease of the body weight (FIGS. 5 and 6). In addition, in the experimental group to which the *Lactobacillus helveticus* strain (Accession No. KCTC 14110BP) was orally administered, none of the mice died. In contrast, the mice in the experimental group to which the respective remaining 9 strains of lactic acid bacteria was administered orally, the survival rate decreased rapidly after 15 days (FIGS. 7 and 8). Furthermore, the mouse to which the *Lactobacillus helveticus* strain (Accession No. KCTC 14110BP) was administered orally showed the longest colon length by measurement. Meanwhile, the mouse to which the *Lactobacillus lactis* strain was administered orally showed a decrease in the colon length (FIGS. 9 and 10). In addition, as a result of histological analysis of the intestinal tissue of the mouse, to which the *Lactobacillus helveticus* strain (Accession No. KCTC 14110BP) was administered orally, uniform intestinal tissue was observed (FIG. 11).

As used herein, the term "inflammation" refers to a reaction to protect a living body against harmful factors, and includes a series of processes in which immune cells, blood vessels, and inflammatory mediators are involved to inhibit damage to cells; to remove damaged tissues and necrotic cells, and to regenerate tissues. The term "inflammatory disease" is a collective term for a disease whose main lesion is inflammation.

The inflammatory disease may be any one selected from the group consisting of inflammatory bowel disease, systemic lupus erythematosus, scleroderma, atopic dermatitis, psoriasis, anaphylaxis, dermatitis, diabetic retinopathy, retinitis, macular degeneration, uveitis, conjunctivitis, arthritis, rheumatoid arthritis, ankylosing spondylitis, osteoarthritis, osteoporosis, allergy, diabetes, diabetic nephtropathy, pyelitis, nephritis, Sjogren syndrome, autoimmune pancreatitis, periodontal disease, asthma, graft versus host disease, chronic pelvic inflammatory disease, endometritis, rhinitis, transplant rejection, and chronic prostatitis.

The inflammatory bowel disease may be any one disease selected from the group consisting of Crohn's disease, ulcerative colitis, intestinal Bechet's disease, and enteritis.

As used herein, the term "inflammatory bowel disease" refers to a disease which causes chronic inflammation in the gastrointestinal tract, and it may include all of the inflammatory diseases that occur in the intestines, such as infectious enteritis (e.g., bacterial, viral, amoebic, tuberculous enteritis, etc.), ischemic intestinal disease, and radiation enteritis. Although the cause of inflammatory bowel disease has not yet been clearly identified, it is known to be genetically and environmentally affected and mediated by immunological abnormalities.

As used herein, the term "Crohn's disease" refers to a chronic inflammatory bowel disease which occurs throughout the gastrointestinal tract from the mouth to the anus. As an autoimmune disease, Crohn's disease mostly develops in the ileocecal region, which is a boundary region between the small intestine and large intestine, and frequently occurs in the large intestine, the distal ileum, the small intestine, etc. Crohn's disease is characterized by repetition of a symptomatic period (during which symptoms such as abdominal pain and diarrhea appear) and an asymptomatic period. Although the exact cause of Crohn's disease has not been elucidated, it is believed that mycobacterial infection, measles virus infection, excessive immune response to normal bacteria in the digestive tract, etc. are involved.

As used herein, the term "ulcerative colitis" refers to a type of diffuse nonspecific inflammation disease which mainly invades mucous membrane and forms erosion or ulcers. The cause of ulcerative colitis has not yet been clearly elucidated and it causes various systemic symptoms such as bloody diarrhea.

As used herein, the term "Bechet's disease" refers to a disease in which oral and genital ulcers and ocular inflammation repeatedly occur, and it is a systemic and chronic disease involving the cardiovascular system, nervous system, digestive tract, livers, spleens, kidneys, and lungs. When Bechet's disease invades the intestine, it is called "intestinal Bechet's disease". The "intestinal Bechet's disease" is a nonspecific and relapsing chronic inflammatory disease which accompanies symptoms such as abdominal pain and diarrhea, and it may also accompany complications such as bleeding and perforation.

As used herein, the term "prevention" refers to any action which inhibits or delays the occurrence, spread, and recurrence of a target disease by administration of the composition. The term "prevention" as used in the present disclosure refers to any action which alleviates or beneficially alters the symptoms of the target disease by the administration of the composition. Specifically, the action includes cure, alleviation, forestallment, prevention, delay, or reduction of symptoms which are caused by inflammatory diseases.

The pharmaceutical composition according to the present invention may be formulated in a suitable form with at least one pharmaceutically acceptable carrier, and may further contain a cryoprotectant, an excipient, or a diluent. The term "pharmaceutically acceptable" refers to that it is physiologically acceptable and usually does not cause severe gastrointestinal disorders, dizziness, allergic reactions, or similar reaction when administered to humans.

Specifically, the cryoprotectant may be at least one selected from the group consisting of glycerol, trehalose, maltodextrin, skim milk powder, and starch. In addition, the excipient may be one or more selected from the group consisting of glucose, dextrin, and skim milk powder.

The cryoprotectant may be included in an amount of 0.01 wt % to 20 wt %, 0.01% wt % to 10 wt % based on the total weight of the composition, and specifically, the glycerol may be included in an amount of 5 wt % to 20 wt %, the trehalose may be included in an amount of 2 wt % to 10 wt %, the maltodextrin may be included in an amount of 2 wt % to 10 wt %, the skim milk powder may be included in an amount of 0.5 wt % to 2 wt %, and the starch may be included in an amount of 0.1 wt % to 1 wt % in the composition, based on the total weight of the composition. In addition, the excipient may be included in an amount of 75 wt % to 95 wt % or 85% to 95 wt % based on the total weight of the composition.

Examples of the carriers and diluents that may be included in the pharmaceutical composition may include gum acacia, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate, and mineral oil. When formulated, the pharmaceutical composition is prepared using a diluents or excipient, such as a filler, an extender, a binder, a wetting agent, a disintegrant, and a surfactant that are commonly used.

In addition, as the pharmaceutically acceptable carrier, a carrier for oral administration may be further included. The carriers for oral administration may include lactose, starch, cellulose derivatives, magnesium stearate, stearic acid, etc. Suitable stabilizers are antioxidants, such as sodium bisulfite, sodium sulfite, and ascorbic acid. Suitable preservatives are benzalkonium chloride, methyl- or propyl-paraben, and chlorobutanol. The pharmaceutical composition according to the present invention may further include a lubricant, a wetting agent, a sweetening agent, a flavoring agent, an emulsifying agent, a suspending agent, etc., in addition to the above components.

The composition according to the present invention may be administered to mammals including humans by any method. For example, it may be administered orally.

The pharmaceutical composition according to the present invention may be formulated into a formulation for oral administration according to the route of administration as described above.

In the case of formulations for oral administration, the composition according to the present invention may be formulated into powders, granules, tablets, pills, sugar-coated tablets, capsules, solutions, gels, syrups, slurries, suspensions, etc. using the methods known in the art. For example, for oral formulations, an active ingredient is combined with a solid excipient, and then, the mixture is pulverized and a suitable supplement is added, followed by processing the resultant into a granular mixture to obtain tablets or sugar-coated tablets. Examples of suitable excipients may include sugars (which include lactose, dextrose, sucrose, sorbitol, mannitol, xylitol, erythritol, maltitol, etc.); starches (which include corn starch, wheat starch, rice starch, potato starch, etc.); celluloses (which include cellulose, methylcellulose, sodium carboxymethylcellulose, hydroxypropylmethyl-cellulose, etc.); and fillers (e.g., gelatin, polyvinylpyrrolidone, etc.). In addition, in some cases, cross-linked polyvinylpyrrolidone, agar, alginic acid, sodium alginate, etc. may be added as a disintegrant. Furthermore, the pharmaceutical composition according to the present invention may further include an anti-aggregating agent, a lubricant, a wetting agent, a fragrance, an emulsifying agent, a preservative, etc.

The pharmaceutical composition according to the present invention may be administered in a pharmaceutically effective amount. As used herein, the term "a pharmaceutically effective amount" refers to an amount sufficient to treat or prevent a disease at a reasonable benefit/risk ratio applicable to medical treatment or prevention. The effective dosage level may be determined according to the factors including: the severity of the disease; activity of the drug; the patient's age, weight, health, sex, and sensitivity to the drug; time of administration, route of administration, and the rate of excretion of the composition according to the present invention used; duration of treatment; drugs to be combined with or simultaneously used with the composition according to the present invention used; and other factors well known in the medical field.

The pharmaceutical composition according to the present invention may be administered as an individual therapeutic agent or administered in combination with other therapeutic agents, and may be administered sequentially or simultaneously with a conventional therapeutic agent. The pharmaceutical composition may be administered by a single dose or multiple doses. Considering all of the above factors, it is important to administer an amount that can achieve the maximum effect with a minimum amount without side effects.

The formulation, route of administration, and method of administration of the pharmaceutical composition according to the present invention are not particularly limited, as long as the pharmaceutical composition exhibits the effects according to the present invention.

Still another aspect of the present invention provides a food composition for preventing or inhibiting inflammatory disease, containing a *Lactobacillus helveticus* strain (Accession No. KCTC 14110BP) or a culture thereof.

The *Lactobacillus helveticus* strain (Accession No. KCTC 14110BP) is the same as described above.

The food composition includes all forms including functional food, nutritional supplements, health food, food additives, etc. and this type of food composition may be prepared in various forms according to conventional methods known in the art.

When the strain is used as a food additive, the strain may be added as it is or used with other food or food ingredients, and it may be appropriately used according to a conventional method. The mix amount of the active ingredient may be appropriately determined depending on the purpose of use (prevention, health, or therapeutic treatment). In general, when prepare food or beverage, the active ingredient may be added in an amount of 0.0001 wt % to 1 wt %, specifically 0.001 wt % to 0.1 wt % of the raw material composition containing the strain. However, in the case of long-term intake for health and hygiene or health control purposes, the amount to be used may be even the same as or below the above range.

Still another aspect of the present invention provides a feed composition for preventing or inhibiting inflammatory disease containing a *Lactobacillus helveticus* strain (Accession No. KCTC 14110BP) or a culture thereof.

The *Lactobacillus helveticus* strain (Accession No. KCTC 14110BP) is the same as described above.

The feed composition for preventing or inhibiting inflammatory disease may be prepared by adding a *Lactobacillus helveticus* strain (Accession No. KCTC 14110BP) in an appropriate effective concentration range according to various feed preparation methods known in the art.

Still another aspect of the present invention provides a method for preventing or treating inflammatory disease, which includes administering a *Lactobacillus helveticus* strain (Accession No. KCTC 14110BP) or a culture thereof to a subject.

The subject may have an inflammatory disease. In addition, the subject may be a mammal, preferably a human. At this time, the *Lactobacillus helveticus* strain (Accession No. KCTC 14110BP) is the same as described above. In addition, the route of administration, administration dose and frequency of administration of the strain or a culture thereof, and the type of inflammatory disease are as described above.

Still another aspect of the present invention provides a use of a *Lactobacillus helveticus* strain (Accession No. KCTC 14110BP) or a culture thereof for treating inflammatory disease.

At this time, the *Lactobacillus helveticus* strain (Accession No. KCTC 14110BP) is the same as described above. In addition, the types of inflammatory diseases are as described above.

MODE FOR CARRYING OUT THE INVENTION

Hereinafter, the present disclosure will be described in more detail by way of the following examples. However, the following examples are only for illustrating the present disclosure, and the scope according to the present invention is not limited thereto.

Example 1. Confirmation of Exacerbation of Inflammatory Bowel Disease Due to High Fat Diet After feeding C57BL/6 mice with a 60% high fat diet (HFD) for 10 weeks, the mice were allowed ad libitum access to a mixture, in which 2% (w/v) dextran sodium sulfate (DSS, MP bio, USA) was mixed with drinking water, for 6 days. Then, the mice were allowed to drink water for 2 days and these mice were set as an experimental group. The mice fed with a normal chow diet (NCD) instead of a high fat diet were set as a control group.

Thereafter, as a result of comparing the amount of change in body weight (%) between the control group and the experimental group, it was found that the mice in the experimental group fed with the high fat diet showed a higher reduction in body weight (FIG. 1).

In addition, after sacrificing the mice in the control group and the experimental group, their intestinal tissue was extracted and fixed with 10% neutral buffered formalin. Thereafter, paraffin sections were prepared and stained with Hematoxylin & Eosin (H&E), followed by histological analysis. In addition to microscopic observation, histological analysis was performed to evaluate the sections by dividing into 1 to 5 scores according to the degree of tissue damage and disability. The higher score was given to the higher degree of damage or disability.

As a result, compared to the control group, an irregular tissue morphology was observed in the intestinal tissue of the experimental group due to an inflammatory reaction, and the scores for tissue damage and disability were also measured to be higher (FIGS. 2 and 3).

Example 2. Screening for Strains Having Therapeutic Effect on Inflammatory Bowel Disease and Confirming Therapeutic Effect Lactic acid bacteria having a therapeutic effect on inflammatory bowel disease were screened among 10 strains of lactic acid bacteria purchased from Mediogen Co., Ltd., using a mouse model.

Example 2.1. Comparison of Changes in Body Weight

After feeding C57BL/6 mice with a 60% high fat diet (HFD) for 12 weeks, the mice were allowed ad libitum access to a mixture, in which 2% (w/v) dextran sodium sulfate (DSS, MP bio, USA) was mixed with drinking water, for one week from the $10^{th}$ week. Then, the mice were allowed ad libitum access to a mixture, in which 3% (w/v) dextran sodium sulfate was mixed with drinking water for about 10 days from the $11^{th}$ week. The mice fed with only a 60% high fat diet were set as a control group (Mock). Each lactic acid bacteria was orally administered in an amount of $5 \times 10^9$ CFU per mouse at intervals of 2 to 3 days for 12 weeks. Thereafter, in order to determine whether the symptom of weight loss, which is one of the typical symptoms of inflammatory bowel disease, was alleviated, the amount of changes in body weight of the control group and the experimental group was measured (FIG. 4).

As a result, the mice in the experimental group administered orally with the *Lactobacillus helveticus* MG585 strain showed an increase in their body weight compared to those of the control group. Meanwhile, the mice in the experimental group, to which the respective remaining 9 strains of lactic acid bacteria was orally administered except for the *Lactobacillus helveticus* MG585 strain, the body weight was decreased compared to those of the control group (FIGS. 5 and 6).

Example 2.2 Comparison of Survival Rate

In Example 2.1 above, the survival rates of the mice in the control group (Mock) and the experimental group were compared during oral administration of dextran sodium sulfate and each lactic acid bacteria from the 10th week.

As a result, none of the mice died in the experimental group to which *L. helveticus* MG585 strain was administered orally. Meanwhile, in the case of the mice in the experimental group to which the respective remaining 9 strains of lactic acid bacteria was orally administered except for the *L. helveticus* MG585 strain, the survival rate was rapidly decreased after 15 days (FIGS. 7 and 8).

Example 2.3. Comparison of Intestinal Length

In order to confirm whether symptom of intestinal length decrease, which is one of the representative symptoms of inflammatory bowel disease, was alleviated, the intestines were extracted from the mice in an experimental group, to which the *L. helveticus* MG585 strain (which was most effective in Example 2.1 and Example 2.2 above) was orally administered, and the mice in an experimental group, to which the *L. lactis* strain (which was most ineffective in Example 2.1 and Example 2.2 above) was orally administered, and their colon length was measured. At this time, the intestine was extracted from the mice of the control group (Mock) as well to compare the colon length.

As a result, the measurement showed that the mice in the experimental group, to which the *L. helveticus* MG585 strain orally administered have the longest colon length, and the colon length was decreased in the mice in the control group and the mice in an experimental group, to which the *L. lactis* strain was orally administered (FIGS. 9 and 10).

Example 2.4. Comparison Through Histological Analysis

The intestinal tissue extracted in Example 2.3 was fixed with 10% neutral buffered formalin. Thereafter, the paraffin sections were prepared and stained with Hematoxylin & Eosin (H&E), and then, histological analysis was performed.

As a result, irregular intestinal tissues caused by an inflammatory reaction were observed in the mice in the control group (Mock) and the mice in the experimental group to which the *L. lactis* strain was orally administered, while uniform intestinal tissues were observed in the mice in an experimental group to which the *L. helveticus* MG585 strain was orally administered (FIG. 11).

Through this, it was confirmed that the *L. helveticus* MG585 strain among the 10 strains of lactic acid bacteria exhibited an excellent therapeutic effect on inflammatory bowel disease.

ACCESSION NUMBER

Name of Depository: Korean Collection for Type Cultures (KCTC), Korea Research Institute of Bioscience and Biotechnology Address of Depository: 181, Ipsin-gil, Jeongeup-si, Jeollabuk-do 56212, Republic of Korea Accession Number: KCTC 14110BP Date of Deposit: Jan. 14, 2020

What is claimed is:

1. A pharmaceutical composition comprising, as an active ingredient, lactic acid bacteria consisting of a *Lactobacillus helveticus* strain deposited as Accession No. KCTC 14110BP or a culture thereof, wherein the pharmaceutical composition is formulated into an oral formulation, wherein the formulation for oral administration is tablets, pills, capsules, gels, syrups or suspensions.

2. A method for treating inflammatory disease comprising:
    administering a *Lactobacillus helveticus* strain deposited as Accession No. KCTC 14110BP or a culture thereof to a subject.

3. The method of claim 2, wherein the inflammatory disease is any one selected from a group consisting of inflammatory bowel disease, systemic lupus erythematosus, scleroderma, atopic dermatitis, psoriasis, anaphylaxis, dermatitis, diabetic retinopathy, retinitis, macular degeneration, uveitis, conjunctivitis, arthritis, rheumatoid arthritis, ankylosing spondylitis, osteoarthritis, osteoporosis, allergy, diabetes, diabetic nephropathy, pyelitis, nephritis, Sjogren syndrome, autoimmune pancreatitis, periodontal disease, asthma, graft versus host disease, chronic pelvic inflammatory disease, endometritis, rhinitis, transplant rejection, and chronic prostatitis.

4. The method of claim 3, wherein the inflammatory bowel disease is any one disease selected from a group consisting of Crohn's disease, ulcerative colitis, intestinal Bechet's disease, and enteritis.

5. The method of claim 2, wherein the strain or the culture thereof includes a cryoprotectant or excipient.

6. The method of claim 5, wherein the cryoprotectant is any one or more selected from a group consisting of glycerol, trehalose, maltodextrin, skim milk powder, and starch.

7. The method of claim 5, wherein the excipient is any one or more selected from a group consisting of glucose, dextrin, and skim milk powder.

8. The method of claim 2, wherein the *Lactobacillus helveticus* strain deposited as Accession No. KCTC 14110BP or the culture thereof is comprised in a food composition.

9. The method of claim 2, wherein the *Lactobacillus helveticus* strain deposited as Accession No. KCTC 14110BP or the culture thereof is comprised in a feed composition.

* * * * *